United States Patent Office 2,913,342
Patented Nov. 17, 1959

2,913,342

POWDERED FAT COMPOSITION AND PROCESS

Donald E. Cameron and William H. Chilson, Mount Tabor, N.J., Charles C. Elsesser, Hollis, N.Y., and Rudolf Windmuller, Hoboken, N.J., assignors to General Foods Corporation, White Plains, N.Y., a corporation of Delaware No Drawing. Application July 27, 1956
Serial No. 600,384

35 Claims. (Cl. 99—123)

This invention relates to a powdered free flowing fat composition and to a process for preparing the same. This application is a continuation-in-part of U.S. application S.N. 517,646, filed June 23, 1955, for Food Product and Process.

Powdered fat compositions consisting generally of small particles of fat incased in a coating of edible, water soluble solids, and their use in various food products such as cakes, pastries, bread, toppings, and the like, are well known. It has been proposed, for example, to dry emulsions of shortening fat and non-fat milk solids either by spray drying, drum drying, or the like, to provide a powdered free flowing shortening composition. Such proteinaceous materials as buttermilk solids, whey solids, whole eggs, egg yolks, gelatin, sodium caseinate, and neutral water soluble soy protein have been proposed as encapsulating solids; the use of other materials, either separately or in combination with some of the aforesaid proteinaceous materials, including gums such as cellulose ethers, gum tragacanth, gum acacia and carbohydrates such as starches and sugars has also been proposed. Furthermore, improved powdered fat products have been prepared employing "emulsifiers" such as lecithin, partial esters of glycerin and the higher fatty acids, and partial ester; of sorbitol and the higher fatty acids.

These powdered fat compositions offer the advantages of ease of handling and of incorporation with other dry free flowing ingredients during the preparation of various food products. They have enjoyed a fair amount of commercial success. Thus they have been used as part of the shortening in donut, cake and biscuit mixes where it is desired to have a free flowing product, but in all of these applications there is usually also employed a plastic shortening due to the inability of the powdered fat to act by itself to supply the fat needed.

For example, a large potential use of powdered fat compositions is in prepared cake mixes. The present mode of incorporating shortenings into these mixes roughly parallels that of the housewife and involves the step of creaming the shortening with one or more of the dry ingredients such as sugar or flour. This creaming step is necessary to insure an adequate distribution of the shortening throughout a cake batter prepared from such a mix. It is obvious that the use of powdered shortenings would provide a great advantage to a cake mix manufacturer by eliminating the costly and time consuming creaming operation. A powdered shortening would also be preferred over conventional modes of incorporating plastic and like shortenings in dry mixes for bakery products because it affords the opportunity to emulsify the fat phase in a matrix of water soluble materials with the possibility of lessening the effort required for proper dispersion of the fat in the batter and controlling the manner in which the fat becomes available for effective cooperation with the farinaceous ingredients, the sugar and the leavening agent in a mix as it is hydrated to a batter. However, the presently available powdered shortenings, even when they contain so-called superglycerinated fats, produce cakes extremely poor in volume and rubbery in texture; the reason generally given for this poor quality is the manner in which the fat phase of the powdered shortening is released to be effective in cake baking. Either the fat is released too slowly and hence is not effectively utilized or else the fat is released from its matrix in such a way as not to be properly dispersed throughout the batter during its preparation. For this reason, attempts have been made to modify the manner in which the shortening fat is released from the powdered fat compositions on contact with aqueous liquids by the use of hydrophilic colloids. However, none of these attempts has been adequate due to the inability of the fat phase released to form the proper emulsion in the batter.

Powdered fat compositions for use in preparing whipped toppings are also known. These materials offer the advantage of ease of handling due to their free flowing character and freedom from spoilage on storage for long periods of time due primarily to their low moisture content. However, because these products generally do not have the texture and appearance of natural whipped cream, when reconstituted and whipped in aqueous liquids, they have not enjoyed much commercial success. More important, however, these materials usually perform in an inconsistent manner providing in many cases little or no overrun on whipping. For example, a paste emulsion of skim milk solids, fat, sucrose, and a mixture of mono- and di-glycerides, while readily whipped when added to whole milk, has been found to be virtually unusable when it is dried. In the dried form an excessive whipping period is required even when a mechanical beater is employed. The problem of whippability is particularly difficult in the case of a dried emulsion which is to be reconstituted and whipped in whole milk, apparently because the fat of whole milk interferes with the whippability of the product from the standpoint of overrun and extent of whipping required. Some improvements in whippability apparently can be obtained by substituting a water soluble protein such as sodium caseinate for the milk solids, but the overrun is usually low, the texture heavy and pasty, and the after-taste or mouth-feel greasy.

It appears that in food emulsions of high fat content wherein air is incorporated into the emulsion that the eventual product comprises a series of bubbles of air or cells which are embraced by an aqueous phase which should be substantially elastic. Surrounding these cells are globules of fat. The elasticity of the cell wall of the aqueous phase is provided by the proteinaceous material present together with other dissolved solids. The fat globules and this aqueous phase should be sufficiently stable so as to prevent the emulsion from breaking as evidenced by either weeping of the aqueous phase or churning i.e., the excessive coalescence of quantities of fat which with continued whipping results in the complete separation of the fatty constituents from the aqueous phase. At the same time the foam system of the aqueous phase should be capable of incorporating sufficient air in the presence of the fat globules so that a high degree of overrun is obtained in a short whipping interval after the product is reconstituted in whole milk or other aqueous liquid. Apparently the emulsifiers previously employed in powdered fat compositions are unable to maintain the fat phase in a dried emulsion in compatible relation with the foam system created in the aqueous phase, the common experience being a product of a low overrun, requiring a prolonged whipping period, and having poor stability, appearance and texture. In toppings and like whipped food emulsions calling for high levels of emulsifiers, the product has a pasty, heavy texture and greasy mouth-feel.

It is, therefore, an object of the present invention to provide a powdered fat composition wherein the fat phase and encapsulating solids perform more effectively upon reconstitution with aqueous liquids in preparing food products generally.

Another specific object of this invention is to provide a powdered fat composition which on incorporation as a shortening in prepared mixes provides baked goods of uniformly high quality and ease of preparation.

Another specific object of this invention is to provide a powdered fat composition which on reconstitution with milk or water and whipping provides an edible emulsion such as a whipped topping which combines the properties of superior mouth-feel, overrun, whipping ease, texture, appearance, and stability.

These and other objects of the present invention will be more fully developed hereinafter.

It has now been found that a dried emulsion containing a fat and one of the aforesaid encapsulating agents provides a powdered fat composition capable of effectively releasing its fat content from a matrix of encapsulating solids upon contact with aqueous liquids when there is included in said composition a partial ester of a glycol and a higher fatty acid. In this manner, a powdered fat composition is provided which is suitable for a wide range of uses including cakes, pastries, breads, toppings, spreads, and the like. On incorporation of these compositions in dry mixes, for preparing baked goods, a mix which may be reconstituted in a very short time and with a minimum of effort is obtained which, at the same time, provides a final food product of exceptionally high quality. When, in addition to reconstitution, the powdered fat composition is to be whipped and accordingly contains a foam-forming protein for the aqueous phase of an emulsion, it appears that the partial ester of a glycol and a higher fatty acid also enhances the compatibility of the aqueous phase and the fat globules such that a higher degree of overrun is obtained. Whether this latter improvement is due to a modification of rehydration or other properties of the protein or is due to a cooperative effect with the fat globules exclusively in an emulsion or stems from a combination of such phenomena is difficult to determine. In any event such a finding is unexpected inasmuch as a paste emulsion containing the present partial ester has generally been found to be quite inferior in overrun compared to pastes containing mono- and di-glycerides for example.

It has further been found that the addition of various lecithins, and modifications and derivatives thereof, to the present above fat composition provides for a further improvement in the condition of the fat phase of the dried emulsion after reconstitution and in improved quality in the final food product. In the case of bakery products generally the presence of lecithin in combination with the above partial esters appears to emulsify the fat phase of the reconstituted dried emulsion in the form of discrete emulsified globules whereby the shortening fat is ideally distributed in the batter during baking. Where the powdered fat is simply reconstituted and whipped to an aerated emulsion, as aforesaid, the texture of the whip is finer and smoother, and the whip is more stable as evidenced by the body and peaking provided when lecithin is employed. In the present dried emulsion it appears that when the protein has foreign materials associated or complexed therewith, as is the case for skim milk or other milk solids, that such protein is unable by itself to disperse and imbibe water in the presence of the fat phase such that lecithin as well as a partial glycol ester of the above type is necessary for short whipping time and high overrun. The term lecithin, as used herein and in the appended claims, is intended to mean phosphatide compositions derived from materials such as soybeans, corn, cottonseed, peanuts, egg yolks, liver, and the like, containing lecithin in varying degrees of purity. Also, phosphatides modified by various processes, such as hydroxylation, phosphorylation, and the like, may be employed.

The most preferred form of lecithin is a vegetable phosphatide which in addition to phosphatidic material has an oleaginous carrier such as soy bean oil or cocoa butter. It is desirable for the purposes of the present invention that the lecithin be highly water dispersible but at the same time have a sufficient emulsification power for the fat phase of the system. By means of hydroxylation, that is the saturation of higher fatty acid groups in the phosphatides such that their degree of unsaturation is reduced, the fat phase is most desirably emulsified into discrete fat globules while being dispersible in the aqueous phase of the system. Hydroxylation is carried out using reagents or combinations thereof described in U.S. 2,445,948 to Wittcoff, July 27, 1948. Actually, it has been found that when employing a hydroxylated lecithin which has an intermediate degree of saturation that there is a more desired balance in the properties of water dispersibility and emulsification so that the phosphatide is most preferably only partially hydroxylated. Thus, in the case of a soy lecithin originally composed of about 65% phosphatide and 35% soy bean oil, the hydroxylated lecithin should have an iodine number in the order of 80. Such a partially saturated lecithin derivative has the additional advantage, of course, of being more stable on storage.

The benefits of this invention are particularly apparent in powdered fat compositions containing, in addition to the aforementioned partial ester and lecithin, a selectively hydrogenated fat, a cow's milk protein or protein derivative such as non-fat milk solids, sodium caseinate or whey solids, and a sugar. In the preparation of these materials, the process which is generally employed requires that an emulsion be made of the fat in an aqueous solution of the milk solids and sugar. This emulsion is then dried by any suitable means such as spray drying, drum drying, and the like; where the material is drum dried, the final flaked product is comminuted to provide a powdered free flowing shortening. In the case of spray drying, however, the final product is in a form which is particulate and free flowing. As viewed under a high power microscope the particles in this latter case are hollow spheres consisting of a matrix of the non-fat milk solids and sugar in which a fine distribution of fat globules is embedded.

The desired partial ester of a glycol and a higher fatty acid may be obtained by reacting any di-hydric alcohol and higher fatty acids, or fats containing fatty acids. The partial esters can be prepared by a number of techniques involving the use of heat and a suitable catalyst. The most common approaches involve either (1) the methylation of fats and the subsequent reaction of the methyl esters with glycol or, (2) the direct esterification of glycol and fatty acids. In the process of esterifying the partial ester the degree of esterification may be complete for some esters formed such that in addition to mono-esters each containing one hydroxyl and one fatty acid there may also be produced di-esters having both hydroxyls substituted for by fatty acids. It has been found that the di-esters by themselves do not provide any improved result in the present dried emulsion. The mono-esters, on the other hand, are essential; but for the more preferred results a mixture of mono and di-esters is required. In the esterification of stearic acid and propylene glycol, for example, it has been found preferable to have a mono-ester content greater than 40% and less than 80%. Generally, it is required that the ratio of mono-esters to di-esters be sufficiently high as to insure a substantial presence of the former. The fatty acid should be saturated and preferably is such that in reaction with the glycol there result sufficiently low melting partial esters whereby a greasy feel in the mouth is avoided when a product such as a whipped topping is consumed. Partial glycol esters useful in the present invention may be prepared from fatty acids having chain lengths ranging from 12 to 22 carbon atoms, e.g., partial glycol esters of lauric, myristic, palmitic, stearic, behenic and arachidic acids. Specific partial esters found operable in the present invention are propylene glycol mono-stearate, propylene glycol mono-palmitate, propylene glycol mono-laurate, and propylene glycol, mono-myristate, although some di-esters in this series are also usually present with the partial esters. The higher fatty acids in the aforesaid group are preferred due to their stability where elevated temperatures are employed in drying an emulsion containing such partial esters as are derived therefrom. Lower fatty acids generally are not stable either in storage or as a result of the drying operation and consequently fail to provide the desired emulsifying effect. In the case of propylene glycol mono-laurate, for example, this partial ester, while essentially effective in providing the desired emulsification in the case of whipped topping, also provided a soapy off-taste rendering it unsuitable for use in any flavorful emulsion. Other glycols can be employed as the glycol portion of the ester. These include the polyoxyethylene glycols, the butylene glycols, di-propylene glycol, di-ethylene glycol, and the like, and include the polymers of the various simple glycols. While all the glycols mentioned here will function according to the invention in bringing about the desired release of fat from the dried emulsion on contact with aqueous liquid, propylene glycol is preferred due to its greater suitability for use in food products. The more preferred smulsifying agents employed according to this invention are either a mixture of propylene glycol mono- and distearate, a mixture of propylene glycol mono- and dipalmitate, or a blend of these mixtures.

The most preferred emulsifying agent is a mixed partial ester prepared by reacting propylene glycol with commercial "triple pressed" stearic acid which contains approximately 45% stearic acid and 55% palmitic acid. The monoester content should be between 40% and 80%, the level of this partial ester used being of the order of 10–15% by weight of the composition and 20–45% by weight of fatty constituents. The level of the glycol fatty acid ester employed in the compositions of this invention will, of course, vary with the nature and type of ester employed and the intended end use of the compositions.

Although relatively low levels of glycol fatty acid esters in the dry fat composition of the present invention provide improved results when such compositions are employed in a cake mix, a powdered topping composition, and the like, it is preferred that the levels of glycol esters contained in the fat composition be of the order of 10–15% of such composition generally.

The encapsulating solids which may be employed according to this invention include all of those materials well known in the art. Any of the various proteinaceous hydrophilic colloids, such as non-fat milk solids, whey solids, sodium caseinate, neutral water soluble soy protein derivatives, egg albumin, gelatin, partially hydrolyzed fish protein, buttermilk solids, whole eggs, egg yolks, can be employed. These proteinaceous materials should be dispersible in the aqueous phase of the reconstituted dry emulsion. The proteinaceous material must have the ability to imbibe water and form a foam structure, i.e., one having air entrapped in the emulsion. Various gums such as the cellulose ethers, pectin, algins, gum arabic, gum tragacanth, and the like, may be employed as adjuncts to the above proteinaceous material but it is at least essential that some form of protein be present in a dispersible form which provides a foam structure whether for baked goods or an edible emulsion. Similarly, in conjunction with these proteinaceous materials, either singly or as mixtures thereof, carbohydrates, such as flour, raw or gelatinized starches from various sources such as corn, tapioca, potato, sago, sorghum, rice, waxy maize, wheat, and the like, and sugars, such as sucrose, dextrose, corn syrup solids, lactose, and the like, may be employed.

These encapsulating materials may be employed in any suitable combination. It is preferred to employ according to this invention, a mixture of non-fat milk solids and sucrose as the encapsulating solids where the dried emulsion is used as a cake shortening, although a neutral, dispersible form of casein, e.g., sodium caseinate, is also preferred in view of the smaller quantity required relative to the skim milk solids.

When the powdered fat of the present invention is to be employed for the preparation of an edible emulsion such as a whipped topping, included in the encapsulating material should be a substantial quantity of a neutral water soluble form of protein which may be of either animal or vegetable origin. The presence of a soluble form of protein in the aqueous phase is virtually essential to the creation of an aerated foam system capable of carrying fat globules, since otherwise any substantial overrun through whipping is not obtained. In addition it is preferred that the protein be substantially free of any foreign substances since the latter appear to reduce the whippability of the aqueous phase in the presence of the fat globules at least. For this reason non-fat milk solids are less preferable than an isolated neutral water soluble protein derivative such as sodium caseinate. The former renders absolutely essential the use of lecithin in addition to the aforesaid partial esters in the composition, whereas sodium caseinate, while desirably employing lecithin, does not require it in combination with the other ingredients for whippability; lecithin, however, does provide a finer texture to a whip and for this reason it is also used. Of the various derivatives of casein, sodium caseinate is the most preferred inasmuch as it provides the powdered fat with optimal whippability over a wider range of temperatures and hence is less sensitive to variations in the temperature of the aqueous liquid in which the dried emulsion is reconstituted and whipped.

Also in the case of a whipped emulsion it is desirable that a water soluble encapsulating solid other than a protein be employed, for, in addition to the economy realized from the use of such agents as sucrose, dextrose, corn syrup solids and lactose, the fat is released from the matrix of water soluble material more quickly.

Basic shortening fat constituents of these compositions may be any of those normally employed in the preparation of the particular food product to which the final composition will be directed. For example, in preparing these shortening compositions for use in cakes or other baked goods, the usual shortenings such as lard, modified lard, cottonseed, coconut, peanut and corn oil, which have been hardened by hydrogenation; butter, or any combination of oils, semi-solid or solid fats, may be employed. These materials may have the melting point range, saponification value, iodine number, and other characteristics found to be desirable in the preparation of the particular baked goods desired. On the other hand, the characteristics or nature of the fat to be employed in a whippable topping composition may vary from that desired in a baked product. In general the fat in combination with the emulsifier constituting the fat phase should be solid enough to provide the desired lattice of fat globules necessary to produce a stable whipped emulsion at the temperature at which the product is reconstituted. On the other hand, the fat in combination with the aforesaid partial ester should melt at body temperature or below.

In the preparation of the powdered fat compositions of this invention, the usual processes of the prior art are generally employed. The fatty constituents are melted and emulsified in a warm dispersion of the proteinaceous material and other encapsulating solids by simple stirring. The mixture is then further emulsified by a suitable homogenizer and the emulsion is dried, as by roller drying, spray drying, and the like, preferably by spray drying.

It has been found desirable where milk solids are employed to limit the amount of heat which is applied to the composition after the milk solids have been added. The preferred procedure, therefore, requires that the fatty materials be heated to a temperature of approximately 160° F. and that the milk solids and sugar solution be heated to from 130°–140° F. The fatty materials and milk solids are then immediately mixed and emulsified, the resulting temperature of the emulsion being roughly 150° F. This emulsion is then immediately cooled to approximately 100° F. prior to drying. The skim milk solids which are employed are preferably those from fresh skim milk, and drying temperatures during drying are preferably held to a minimum. Spray drying, of course, permits the use of minimum temperatures during drying.

The compositions of this invention have been found to be useful in a variety of food products. As aforementioned, the ability of these compositions to release the fat component quickly and effectively has a particular advantage in the case of prepared culinary mixes, and more particularly, those directed to the preparation of a shortening cake. Not only do the powdered shortenings of this invention provide the expected benefit of ease of incorporation with the other dry ingredients during manufacturing of the mix but also the quality of the final cake is greatly improved. This improved quality apparently is brought about by the improved manner in which the shortening fat is released during batter preparation and also because of a more favorable fat distribution throughout the prepared batter.

Furthermore, a batter can be prepared from these improved cake mixes with much less difficulty and in a shorter time than with conventional mixes. For example, conventional mixes require the addition of liquid ingredients in at least two separate portions during batter preparation. Also, from 3–5 minutes of mixing by machine or from 5–8 minutes of strenuous beating by hand is required to fully develop the cake batter. On the other hand, the improved mixes of this invention are prepared by initially adding the total amount of liquid ingredients to the dry mix, followed by from 1 to 1½ minutes of simple stirring by hand to provide a completely developed batter. This reduction in time and effort required to fully develop a cake batter provides a significant improvement over conventional mixes.

The improved results attributed to the powdered fat composition of this invention are not restricted to baked goods. For example, an excellent whip like that obtained by whipping cream may be prepared by the simple addition of milk or water to the dry fat composition followed by vigorous beating in a household mixer for from 2–5 minutes. In this manner, a whipped topping similar in many respects to whipped cream is provided. This topping has improved stability and texture characteristics over those of the prior art including whipped cream. The degree of overrun is increased and the work required to provide a whip is decreased over the powdered mixes of the prior art. In addition where the usual prior art products require water for reconstitution, these compositions can be successfully reconstituted and whipped with fresh whole milk. This is a decided improvement, because the fat of the whole milk has formerly interfered with the whipping of toppings of this type, resulting in decreased overrun and difficulty in whipping.

In the case of a whipped topping and similar emulsion prepared from the present powdered fat, it has further been found that the whipping time can be reduced and that the body or stiffness of the whip can be increased by tempering the dried emulsion, i.e., cooling the product to a temperature sufficient to crystallize the fat phase of the product, generally below 55° F. Such cooling also increases to some extent the degree of overrun of the product. Cooling can be relatively rapid or can be slow depending upon cooling capacity of the apparatus employed. Thus, a powdered fat which has been tempered between closely spaced plates refrigerated by means of Dry Ice for relatively instantaneous cooling has resulted in these improvements in whippability. On the other hand, like improvements in whippability are also obtained when large quantities of the powdered fat are stored in a container in a room maintained at reduced temperatures, e.g., 35° F. for a period of 3 days. In general, for consistent whippability improvement it is preferred that the product be cooled to below 45° F., although some improvement in whippability is obtained at higher temperatures. This cooling technique is preferably employed in the plant prior to packaging of the product.

Following are specific examples of powdered fat compositions of this invention. Unless otherwise indicated the phrase "propylene glycol monostearate" in the specific examples refers to the ester of propylene glycol and triple pressed stearic acid described hereinabove. "Hydroxylated soy lecithin" refers to a soy phosphatide composed of 65% lecithin and 35% soy bean oil which has been partially hydroxylated at the double bonds of the fatty acid groups in the lecithin by means of hydrogen peroxide treatment with lactic acid, the hydroxylated lecithin having an iodine number of about 80.

Example 1

Ingredients: Percent parts by weight
Hydrogenated cottonseed oil (30° C. congeal point) _____ 36
Propylene glycol monostearate (approximately 45% mono-esters) _____ 13
Hydroxylated soy lecithin _____ 1
Sucrose _____ 25
Non-fat milk solids _____ 25

In preparing a powdered fat from these ingredients, the hydrogenated cottonseed oil, propylene glycol monostearate and lecithin are melted together and mixed at a temperature of 160° F. At the same time, the sucrose and non-fat milk solids are dissolved in 100 parts by weight of water and heated to 140° F. The two mixtures are combined with simple mixing and homogenized in a Manton-Gaulin homogenizer at 500 lbs. per sq. in. (gauge). The emulsion after homogenization is cooled to below 100° F. and then fed directly to a spray drier operating at an inlet temperature of 380°–390° F. and an outlet temperature of about 220° F.

The spray drier is of a conventional design and comprises a cylindrical tower 10 feet in diameter and 30 feet in height. The drier is of the co-current type wherein warmed drying air is introduced at the top of the drier and removed at the bottom. The nozzle is located in the center of the drier, approximately 2.5 feet from its top and adapted to direct the atomized solution downwardly in a conical spray pattern.

The emulsion is fed to the nozzle at a pressure of approximately 500 lbs. per sq. in. (gauge). The dried emulsion has a density of about 0.20 gm./cc. and a moisture content of about 1.0%. The resulting particulate free flowing powder is preferably cooled immediately to 35° F. and thereafter stored at room temperature.

Example 2

In preparing a whipped topping from the material in Example 1, 4 oz. of the powdered fat composition is combined with one cup of milk at refrigerator temperature and whipped in a household mixer (Sunbeam Mixmaster, No. 10) at high speed (850–900 r.p.m.) for 2–3 minutes. The resulting product has an overrun of over 200% and upon flavoring has the texture, taste, and appearance of natural whipped cream. In addition, the whipped product is extremely stable and remains substantially unchanged for a period of 24–48 hours in a refrigerator. Furthermore, if the whip has collapsed slightly on storage, it may be rewhipped with no adverse effects to texture, taste or appearance.

Example 3

A highly acceptable frozen dessert like ice cream in appearance and texture is provided by placing the whipped product of Example 2 together with suitable flavoring materials into a tray and placing the same in a freezing compartment of a household refrigerator for several hours. Unlike the usual frozen desserts, this material does not require mixing during freezing and the final frozen dessert is free from undesirable ice crystallization and has a fine, smooth texture.

Example 4

The powdered fat of Example 1 is employed very successfully as a shortening ingredient in prepared cake mixes. Typical formulas of such mixes are as follows:

| Ingredients | Percent by weight White | Percent by weight Yellow | Percent by weight Devil's Food |
|---|---|---|---|
| Sucrose | 33.4 | 36.0 | 35.0 |
| Flour, patent wheat | 36.5 | 35.0 | 31.0 |
| Sodium chloride | .7 | .7 | .7 |
| Sodium bicarbonate | .6 | .6 | 1.1 |
| Sodium acid pyrophosphate | 1.0 | 1.0 | .6 |
| Powdered fat composition of Example 1 | 26.0 | 26.0 | 26.0 |
| Cocoa | | | 5.4 |
| Dextrose | 2.0 | | |

In preparing the above mixes, the ingredients are thoroughly mixed together by any of the usual means employed in intimately mixing dry powders. In preparing a cake batter from these mixes, 20 oz. of the mix is added to one cup of water and eggs. In the case of the Yellow and Devil's Food mixes, two whole eggs are employed for each 20 oz. of mix, while in the White cakes only two egg whites are employed.

The development of batter here is extremely simple. After the mixed ingredients have been thoroughly wetted with the aqueous ingredients, which usually takes about 30 seconds, an additional one minute of simple stirring by hand with a spoon is sufficient to fully develop a cake batter. The mixing can also, of course, be carried out with the usual household mixer, batter development again requiring only approximately 1 minute.

The batter is then divided between two 8" layer cake tins and baked at 375° F. for 20–30 minutes. Where the batter is prepared by hand, the resulting layers have an extremely good volume ranging on the average from 1200 cc. in a White cake to 1300 cc. in the Yellow cake and 1350 cc. in the Devil's Food cake. The batters prepared by machine mixing result in cakes having a volume averaging 50 cc. greater. In general, this amounts to an increase of from 50 to 100 cc. in volume over cakes made from conventional mixes. Furthermore, these cakes are of an exceptionally high grade based on their shape, color, texture, grain and eating quality.

An additional important advantage of these mixes is found after storage of the mixes for several months. Where conventional mixes lump badly, with consequent increased difficulty in batter preparation, the mixes here described retain their free flowing characteristics over long periods of storage and remain as easy to prepare as they were originally.

Example 5

Following are formulas of powdered fat compositions found particularly useful as shortenings in cake mixes.

| | A Percent by weight | B Percent by weight |
|---|---|---|
| Hydrogenated cottonseed oil (30° C. congeal point) | 43.0 | 43.0 |
| Propylene glycol monostearate (approximately 45% mono-esters) | 16.0 | 16.0 |
| Hydroxylated soy lecithin | 1.0 | 1.0 |
| Sucrose | 30.0 | 34.0 |
| Non-fat milk solids | 8.0 | |
| Sodium caseinate | 2.0 | 6.0 |

In these two examples, the milk solids have been replaced either partially or completely with sodium caseinate. The emulsions are prepared and dried as in Example 1 and the powdered fat product is employed as in Example 4.

Example 6

A mayonnaise type dressing is prepared by combining 80 gms. of the powdered fat product of Example 1 with 25 ml. of vinegar, 5 gms. of salt, 35 mls. of water, 1 gm. of mustard, 5 gms. of dried egg yolk, and mixing the same for one minute. In this manner, a mayonnaise of superior texture, appearance and eating qualities is obtained. As an alternative procedure, the egg yolk solids and salt together with an alginate stabilizer are incorporated into the emulsion of Example 1 prior to drying. In this case, an emulsion having the following composition is employed.

Ingredients: Percent
- Hydrogenated cottonseed oil (26° F. congeal point) _____ 52
- Propylene glycol monostearate (approximately 45% mono-esters) _____ 12
- Egg yolk _____ 12
- Propylene glycol alginate _____ 1
- Sugar _____ 5
- Salt _____ 4
- Non-fat milk solids _____ 10
- Hydroxylated soy lecithin _____ 2
- Sodium caseinate _____ 2

An emulsion of these materials is prepared and dried according to the procedure outlined in Example 1. In this manner, a dry, fat-containing, mayonnaise mix is provided which on addition of vinegar and water and a small amount of stirring provides a mayonnaise product of superior quality.

Example 7

A highly acceptable Hollandaise sauce may be prepared from the mayonnaise composition of Example 5 by the addition of a butter flavor, color, and appropriate spices either to the emulsion prior to drying or to the mixture during reconstitution. In use, the mixture is heated slightly and applied to the desired food product, such as asparagus. The sauce thus prepared has the flavor and appearance of conventional Hollandaise sauces and is very simply prepared. Further, this sauce may be cooled, stored and reheated with little danger of separation of ingredients such as occurs with conventional Hollandaise sauces.

Example 8

A spread for sandwiches, canapes, hors d'oeuvres, and the like is prepared from the powdered fat product of Example 1 by the addition of water and suitable spices or other flavoring materials. A margarin type spread results from mixing 125 gms. of the product of Example 1 with 35 ml. of water. A simple flavored spread is prepared by thoroughly mixing 180 gms. of a product of Example 1 with 150 mls. of water and 50 ml. of expressed onion juice.

*Example 9*

A pudding of superior texture somewhat resembling a custard type pudding is prepared by adding the powdered fat product of Example 1 to a conventional cooked starch pudding mix in a ratio of 1 part by weight of powdered fat to 7.5 parts by weight of the pudding mix. The pudding is then prepared in the ordinary manner by adding water, cooking, chilling and serving.

*Example 10*

A dry mix for use in preparing flavored milk shakes is prepared according to the following formula:

| Ingredients: | Gms. |
|---|---|
| Powdered fat composition of Example 1 | 25 |
| Sucrose | 75 |
| Cocoa | 20 |
| Malt | 1.5 |
| Dextrose | 3.5 |

20 gms. of this composition is added to 1 cup of milk and blended in a mixer for a short time to provide a full bodied milk shake, similar to those prepared with ice cream.

*Example 11*

A process for the preparation of a partial ester of propylene glycol and stearic acid is as follows: propylene glycol was reacted in the presence of stannous chloride, an esterification catalyst, with commercial grade purified stearic acid (Armour's Neo Fat 18) having about 94% stearic acid, 4% palmitic acid, and 2% oleic acid. The reactants were in the following proportions;

| Reagents | Grams | Moles on pure basis |
|---|---|---|
| "Stearic acid" | 574.7 | 2. |
| Propylene glycol | 624.4 | 8. |
| Stannous chloride | 1.2 | 0.2% of the fat acids. |

The stearic acid was melted and the above reagents were charged into a flask to which was connected a 10″ water-cooled condenser packed with glass beads to recover the water formed in the esterification process. Nitrogen gas was sparged throughout the reaction mixture during reaction. Diffusion of the nitrogen through the mixture was insured by introducing the gas through a sintered glass filter tube, the lower extremity of which was placed just above the bottom of the flask. The reaction mixture was heated to approximately 175° C. and held thereat for 5 to 6 hours until the unreacted fatty acid content in the reaction mixture was less than 5%. The esterification product under the aforementioned conditions had in the order of 60–65% mono-ester. The product was then employed in the preparation of a dried emulsion in accordance with the procedure of Example 1 and the powdered fat was used successfully in accordance with the disclosures of Examples 2–4.

*Example 12*

| Ingredients: | Percent parts by weight |
|---|---|
| Hydrogenated cottonseed oil (30° C. congeal point) | 49 |
| Propylene glycol monostearate (approximately 45% mono-esters) | 10 |
| Hydroxylated soy lecithin | 1 |
| Sucrose | 30 |
| Sodium caseinate | 10 |

In preparing a powdered fat from these ingredients the hydrogenated cottonseed oil, propylene glycol monostearate and lecithin are melted together and mixed at a temperature of 160° F. to 180° F. At the same time, the sucrose and sodium caseinate are dissolved in 50 parts by weight of water and heated to about 140° F. The two mixtures are combined with simple mixing, are emulsified in a high speed mixer, and then homogenized in a Manton-Gaulin homogenizer at 500 lbs. per sq. inch (gauge). The emulsion after homogenization is fed directly to the spray drier described in Example 1 operating at an inlet temperature of 410–420° F. and an outlet temperature of about 200–210° F. The product is preferably cooled prior to whipping to a temperature below 50° F. and preferably at least as low as 45° F. This cooling step like the cooling step in Example 1 is desirable for providing a higher degree of overrun and a more desirable texture, appearance and body in a whipped topping.

*Example 13*

An emulsion was prepared from the ingredients of Example 12 and had the same parts by weight except that the sodium caseinate and sucrose were dissolved in 400 parts by weight of water prior to mixing with the fat phase. The emulsion is fed to the pinch between a pair of steam heated 12″ diameter rolls rotating in opposite direction at about 1 r.p.m. and having an equilibrium steam pressure of 1 to 5 p.s.i. (gauge). A film of material was eventually dried and removed from the drum by a pair of doctor blades located approximately 180° from the point at which the emulsion first contacted the drum. A blast of cool air is uniformly introduced to the plastic emulsion on each drum prior to the emulsion being scraped off the drum between the doctor blades. The product was removed from the drum between doctor blades in the form of a thin sheet which breaks up into a pulverulent powder-like composition. This composition is cooled in a manner described in Example 12 and is operable according to any of the uses described in the foregoing examples.

*Example 14*

A powdered free flowing fat was prepared in accordance with the present invention by freeze drying: a 250 g. solution consisting of 80 g. of hydrogenated coconut oil having a congeal point of 42° C. (Paramount C.), 8 g. of propylene glycol monostearate having in the order of 50% mono-ester, 2.5 g. of hydroxylated soy lecithin, 45 g. of sucrose, and 162 ml. of liquid skim milk (18% solids) was emulsified at 500 p.s.i. (gauge). The emulsion was put on trays, frozen using Dry Ice (solid carbon dioxide), and then freeze dried in a Stokes vacuum freeze drier to a moisture content of less than 3%. After freeze drying, the material was ground gently to a particle size in the order of through a U.S. No. 20 standard mesh screen. The powdered fat was then reconstituted in homogenized whole milk, and whipped in accordance with the procedure of Example 2. The product produced an overrun of over 200% in about two minutes and had the appearance and texture of whipped cream.

*Example 15*

A powdered topping composition was prepared by the process of Example 12 using sodium caseinate as the proteinaceous foam strengthening material of the aqueous phase. Hydroxylated soy lecithin was added as part of the dried emulsion in one case and was absent in the other. Part of the topping powder of each batch was cooled at about 35° F. for three days to crystallize the fat phase of each of the compositions. 4 oz. of each of the powdered fat compositions were reconstituted in one cup of chilled homogenized whole milk and whipped in a mechanical mixer at high speeds.

|  | A<br>Percent by weight<br>Control | B<br>Percent by weight<br>No Lecithin |
|---|---|---|
| Variables: | | |
| Hydrogenated cottonseed oil (36° C. congeal point). | 49 | 49. |
| Propylene glycol monostearate (approximately 45% mono-esters). | 10 | 10. |
| Hydroxylated soy lecithin. | 1 | |
| Sodium caseinate | 10 | 10. |
| Sucrose | 30 | 31. |
| Results (70° F.): | | |
| Whip time (min.) | 4 | 6. |
| Percent overrun | 207% | 165%. |
| Comments | Good body and smooth texture. | Soft peak and body, smooth texture. |
| Tempered (35° F.): | | |
| Whip time (min.) | 2½ | 3½. |
| Overrun | 236% | 187%. |
| Comments | Good peak, good body, smooth texture. | Soft peak and body, smooth texture. |

The presence of the lecithin in the foregoing powdered fats considerably reduced the whipping time required to get optimal overrun in both an untempered and a tempered product. The lecithin also contributed to a rather higher degree of overrun as well as a higher viscosity and improved body and peak of the emulsion. The effect of tempering is quite apparent and tempering generally increased the whippability and overrun.

*Example 16*

The tempered powdered fats of Example 15 were employed as shortenings in prepared cake mixes according to the following formula:

Ingredients: Percent parts by weight
Sucrose _____ 41.79
Flour patent wheat _____ 41.46
Sodium chloride _____ 0.70
Sodium bicarbonate _____ 0.57
Calcium phosphate _____ 0.16
Sodium acid pyrophosphate _____ 0.65
Powdered fat composition of Example 15 ___ 11.67
Dextrose _____ 2.00
Non-fat skim milk solids _____ 1.00

The mixes were used to prepare cake in the manner of Example 4. In the above formula the powdered fat used was either sample A or sample B of Example 15. Cakes were successfully baked in each case using a simple mild hand stirring for approximately one minute (150 strokes), the cakes prepared from fat compositions of sample A having approximately the same volume and grade as that obtained in Example 4. The absence of lecithin, on the other hand, in sample B when used in the aforementioned cake mix formula results in a somewhat lower volume and grade.

*Example 17*

Ingredients: Percent parts by weight
Hydrogenated cottonseed oil (36° C. congeal point) _____ 36
Diethylene glycol monostearate (approximately 92% mono-esters; derivative from triple pressed stearic acid) _____ 13
Hydroxylated soy derivative lecithin _____ 1
Non-fat milk solids _____ 25
Sucrose _____ 25

25 lbs. of the non-fat milk solids and 25 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 275% overrun in 3½ minutes and had good peak and body. The tempered product whipped in two minutes to an overrun of 226% and had good body and peak.

*Example 18*

Ingredients: Percent parts by weight
Hydrogenated cottonseed oil (36° C. congeal point) _____ 36
Propylene glycol monopalmitate (approximately 62% mono-esters) _____ 13
Hydroxylated soy derivative lecithin _____ 1
Non-fat milk solids _____ 25
Sucrose _____ 25

25 lbs. of the non-fat milk solids and 25 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 207% overrun in 5 minutes and had good peak and body. The tempered product whipped in 4.5 minutes to an overrun of 250% and had good body and peak.

*Example 19*

Ingredients: Percent parts by weight
Hydrogenated cottonseed oil (36° C. congeal point) _____ 36
Propylene glycol monoester of hydrogenated rapeseed fatty acid (behenate) (approximately 73% mono-esters) _____ 13
Hydroxylated soy lecithin _____ 1
Skim milk solids _____ 25
Sucrose _____ 25

25 lbs. of the non-fat milk solids and 25 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 200% overrun in 5 minutes and had a fairly soft body. The tempered product whipped in 4½ minutes to an overrun of 250%.

*Example 20*

Ingredients: Percent parts by weight
Hydrogenated cottonseed oil (36° C. congeal point) _____ 36
Propylene glycol monostearate (approximately 45% mono-esters) _____ 13
Hydroxylated soy lecithin _____ 1
Sodium caseinate _____ 7
Methyl cellulose (25 cps.) _____ 1
Whey solids _____ 17
Sucrose _____ 25

7 lbs. of sodium caseinate, 17 lbs. of whey solids, 1 lb. of the methyl cellulose and 25 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 238% overrun in 5 minutes and the product had a soft, glossy texture. The tempered product whipped in 4½ minutes to an overrun of 267% and had good peak and smooth body.

Example 21

Ingredients: Percent parts by weight
- Hydrogenated cottonseed oil (36° C. congeal point) — 36
- Propylene glycol monostearate (approximately 45% mono-esters) — 13
- Hydroxylated soy lecithin — 1
- Sodium caseinate — 7
- Gum arabic — 1
- Whey solids — 17
- Sucrose — 25

7 lbs. of sodium caseinate, 17 lbs. of whey solids, 1 lb. of gum arabic and 25 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 267% overrun in 5 minutes and the product was slightly soft and the texture had good peak and smooth body. The tempered product whipped in 4 minutes to an overrun of 283% and had good peak and was slightly foamy but had an acceptable texture and body.

Example 22

Ingredients: Percent parts by weight
- Hydrogenated cottonseed oil (33° C. congeal point) — 39.6
- Propylene glycol monostearate (approximately 45% mono-esters) — 14.3
- Hydroxylated soy lecithin — 1.1
- Sodium caseinate — 10.0
- Sucrose — 28.0
- Lactose — 7.0

10 lbs. of the sodium caseinate, 7 lbs. of lactose, and 28 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 283% overrun in 5 minutes and the product had fair peak, and was very smooth. The tempered product whipped in 4 minutes to an overrun of 283% and had good peak and body and very smooth texture.

Example 23

Ingredients: Percent parts by weight
- Hydrogenated coconut oil (congeal point 110° F.) — 30
- Propylene glycol monostearate (approximately 45% mono-esters) — 11
- Non-fat milk solids — 33
- Sucrose — 25
- Hydroxylated soy lecithin — 1

33 lbs. of the non-fat milk solids and 25 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 224% overrun in 3½ minutes and the product had good body and texture. The tempered product whipped in 2 minutes to an overrun of 210% with the product providing no greasy after-feeling in the mouth.

Example 24

Ingredients: Percent parts by weight
- Hydrogenated soy bean oil (35° C. congeal point) — 36
- Hydroxylated soy lecithin — 1
- Propylene glycol monostearate (approximately 45% mono-esters) — 13
- Non-fat milk solids — 25
- Sucrose — 25

25 lbs. of the non-fat milk solids and 25 lbs. of sucrose were dissolved in 50 lbs. of water in the aqueous phase which was then emulsified with the fat phase in accordance with the above parts of weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 200% overrun in 4½ minutes and the product had acceptable body, texture and peak. The tempered product whipped in 3 minutes to an overrun of 200% and the product had acceptable body, texture and peak.

Example 25

Ingredients: Percent parts by weight
- Cocoa butter (36° C. congeal point) — 36
- Propylene glycol monostearate (approximately 45% mono-esters) — 13
- Hydroxylated soy lecithin — 1
- Non-fat milk solids — 25
- Sucrose — 25

25 lbs. of the non-fat milk solids and 25 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The untempered and the tempered products were then whipped in homogenized whole milk in accordance with the procedure of Example 2. The untempered product whipped to a 200% overrun in 4½ minutes and the product had a soft peak and body with a glossy texture. The tempered product whipped in 3 minutes to an overrun of 200% and had a soft peak and body with a glossy texture.

Example 26

Ingredients: Percent parts by weight
- Hydrogenated cottonseed oil (36° C. congeal point) — 36
- Propylene glycol monostearate (approximately 75% mono-esters) — 13
- Hydroxylated soy lecithin — 1
- Sucrose — 25
- Non-fat milk solids — 25

25 lbs. of the non-fat milk solids and 25 lbs. sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The tempered product was then whipped in homogenized whole milk in accordance with the procedure of Example 2. The tempered product whipped to a 250% overrun in 4 minutes. The product had good body, texture and peak.

*Example 27*

Ingredients: Percent parts by weight
- Hydrogenated cottonseed oil (30° C. congeal point) _____ 36
- Propylene glycol monolaurate (having approximately 50% mono-esters) _____ 13
- Hydroxylated soy lecithin _____ 1
- Sucrose _____ 25
- Non-fat milk solids _____ 25

25 lbs. of the non-fat milk solids and 25 lbs. of sucrose were dissolved in 50 lbs. of water in the aqueous phase which was then emulsified with the fat phase in accordance with the above parts by weight. The emulsion was then dried in accordance with the process of Example 12. Part of the dried product was tempered in accordance with the procedure of Example 12. The tempered product was then whipped in homogenized whole milk in accordance with the procedure of Example 2. The tempered product whipped to a 257% overrun in 4 minutes and the product had good texture, and fairly stiff peak.

*Example 28*

Ingredients: Percent parts by weight
- Hydrogenated cottonseed oil (30° C. congeal point) _____ 36
- Propylene glycol mono-myristate (having approximately 60% mono-esters) _____ 13
- Hydroxylated soy lecithin _____ 1
- Sucrose _____ 25
- Non-fat milk solids _____ 25

25 lbs. of the non-fat milk solids and 25 lbs. of sucrose were dissolved in 50 lbs. of water in the aqueous phase and was then emulsified with the fat phase in accordance with the above parts by weight. The emulsion was then dried in accordance with the process of Example 12. Part of the dried product was tempered in accordance with the procedure of Example 12. The tempered product was then whipped in homogenized whole milk in accordance with the procedure of Example 2. The tempered product whipped to a 225% overrun in 3 minutes. The product had good texture, and fairly stiff peak.

It will be understood that while the present invention has been described in part by means of the specific examples, reference should be had to the appended claims for the definition of the scope of the invention. The phrase "dried emulsion" in the claims refers to the product obtained when a liquid emulsion of the fat phase in an aqueous solution of the hydrophilic encapsulating solids is dried by any of the aforementioned methods to a low moisture content, e.g., 0.5%–2.5%, although this percent moisture is disclosed for purposes of description and not by way of limitation. The term "emulsion" means the dispersion of the fat and the hydrophilic encapsulating solids created when the melted fatty constituents are agitated and preferably homogenized in the aqueous phase prior to drying; homogenization pressures in the order of 500 p.s.i. (gauge) have been found adequate, although even higher homogenization pressures ranging up to 2000 p.s.i. (gauge) may be practiced. The "partial ester of a glycol and a higher fatty acid" recited in the claims contemplates a class of compounds obtained by the esterification of one or more glycol groups and involving the production of essentially a mono-ester for each glycol group, although di-esters may also be formed in the process. Since fatty acids are available only as mixtures thereof, the reacted fatty acid will usually vary for each ester such that the expression "partial ester of a glycol and a higher fatty acid" also contemplates a mixture of such partial esters having different higher fatty acids.

What is claimed is:

1. A powdered fat composition for use as a topping or shortening comprising a dried emulsion of a fat and the partial ester of an edible glycol and a higher saturated fatty acid in a matrix of hydrophilic edible encapsulating solids selected from a group consisting of proteinaceous materials and mixtures of proteinaceous and carbohydrate materials.

2. A powdered fat composition for use as a topping or shortening comprising a dried emulsion of a fat, lecithin, and the partial ester of an edible glycol and a higher saturated fatty acid in a matrix of hydrophilic edible encapsulating solids selected from a group consisting of proteinaceous materials and mixtures of proteinaceous and carbohydrate materials.

3. A powdered fat composition for use as a topping or shortening comprising a dried emulsion of a fat, hydroxylated lecithin, and the partial ester of an edible glycol and a higher saturated fatty acid in a matrix of hydrophilic edible encapsulating solids selected from a group consisting of proteinaceous materials and mixtures of proteinaceous and carbohydrate materials.

4. A powdered fat composition as defined in claim 1, wherein the carbohydrate material is sugar.

5. A powdered fat composition for use as a topping or shortening comprising a dried emulsion of a fat and the partial ester of an edible glycol and a higher saturated fatty acid in a matrix of hydrophilic edible encapsulating solids selected from a group consisting of proteinaceous materials and mixtures of proteinaceous and carbohydrate materials, said solids including a neutral water soluble form of casein.

6. A powdered fat composition for use as a topping or shortening comprising a dried emulsion of a fat and the partial ester of an edible glycol and a higher saturated fatty acid in a matrix of hydrophilic edible encapsulating solids selected from a group consisting of proteinaceous materials and mixtures of proteinaceous and carbohydrate materials, said solids including non-fat milk solids.

7. A powdered fat composition as defined in claim 2 wherein the carbohydrate material is sugar.

8. A powdered fat composition for use as a topping or shortening comprising a dried emulsion of a fat, and the partial ester of an edible glycol and a higher fatty acid in a matrix of hydrophilic edible encapsulating solids, said encapsulating solids being selected from a group consisting of proteinaceous materials and mixtures of proteinaceous and carbohydrate materials, the fatty acids in said partial ester having chain lengths ranging from 12–22 carbon atoms and being substantially saturated.

9. A powdered fat composition as defined in claim 8 wherein the carbohydrate material is sugar.

10. A powdered fat composition for use as a topping or shortening according to claim 8, wherein the glycol is propylene glycol and the higher fatty acid is stearic acid in said partial ester.

11. A powdered fat composition for use as a topping or shortening according to claim 8, wherein the glycol is propylene glycol and the higher fatty acid is palmitic acid in said partial ester.

12. A powdered fat composition for use as a topping or shortening according to claim 8, wherein the glycol is propylene glycol and the higher fatty acids are stearic and palmitic acids.

13. A powdered fat composition for use as a topping or shortening according to claim 8, wherein the ester has a mono-ester content greater than 40% and less than 80%.

14. A powdered fat composition for use as a topping or shortening comprising a dried emulsion of a fat, lecithin, and the partial ester of an edible glycol and a higher fatty acid in a matrix of hydrophilic edible encapsulating solids, said encapsulating solids being selected from a group consisting of proteinaceous materials and mixtures of proteinaceous and carbohydrate materials, the fatty acids in said partial ester having chain lengths ranging from 12–22 carbon atoms and being substantially saturated.

15. A powdered fat composition for use as a topping or shortening according to claim 14, wherein the glycol is propylene glycol and the higher fatty acids are stearic and palmitic acid.

16. A powdered fat composition for use as a topping or shortening according to claim 15, wherein the ester has a mono-ester content greater than 40% and less than 80%.

17. A powdered fat composition for use as a topping or shortening comprising a dried emulsion of a fat, hydroxylated lecithin, and the partial ester of an edible glycol and a higher fatty acid in a matrix of hydrophilic edible encapsulating solids, said encapsulating solids being selected from a group consisting of proteinaceous materials and mixtures of proteinaceous and carbohydrate materials, the fatty acids in said partial ester having chain lengths ranging from 12–22 carbon atoms and being substantially saturated.

18. A powdered fat composition as defined in claim 8 wherein said encapsulating solids are a mixture of a neutral water soluble form of casein and sugar.

19. A powdered fat composition as defined in claim 14 wherein said encapsulating solids are a mixture of a neutral water soluble form of casein and sugar.

20. A process for preparing a fat composition for use as a topping or shortening comprising the steps of forming an emulsion of fat and the partial ester of an edible glycol and a higher saturated fatty acid in an aqueous solution of hydrophilic edible encapsulating solids selected from a group consisting of proteinaceous materials and mixtures of proteinaceous and carbohydrate materials; and drying said emulsion.

21. A process for preparing a fat composition for use as a topping or shortening comprising the steps of forming an emulsion of fat, lecithin, and the partial ester of an edible glycol and a higher saturated fatty acid in an aqueous solution of hydrophilic edible encapsulating solids selected from a group consisting of proteinaceous materials and mixtures of proteinaceous and carbohydrate materials; and drying said emulsion.

22. A process as defined in claim 20, wherein said carbohydrate material is sugar.

23. A process as defined in claim 21, wherein said carbohydrate material is sugar.

24. A process for preparing a fat composition for use as a topping or shortening comprising the steps of forming an emulsion of fat and the partial ester of an edible glycol and a higher saturated fatty acid in an aqueous solution of hydrophilic edible encapsulating solids selected from a group consisting of proteinaceous materials and mixtures of proteinaceous and carbohydrate materials; drying said emulsion; and cooling the dried emulsion to crystallize the fat phase thereof.

25. A process for preparing a fat composition for use as a topping or shortening comprising the steps of forming an emulsion of fat and the partial ester of an edible glycol and a higher saturated fatty acid in an aqueous solution of hydrophilic edible encapsulating solids selected from a group consisting of proteinaceous materials and mixtures of proteinaceous and carbohydrate materials; drying said emulsion; and crystallizing the fat phase of the dried emulsion by cooling the product to below 55° F.

26. A process as defined in claim 25 wherein said carbohydrate material is sugar.

27. A powdered fat composition as defined in claim 6 wherein said solids are a mixture of non-fat milk solids and sucrose, said dried emulsion having been cooled to crystallize the fat phase thereof.

28. A powdered fat composition as defined in claim 5 wherein said solids are a mixture of sodium caseinate and sucrose, said dried emulsion having been cooled to crystallize the fat phase thereof.

29. A powdered fat composition as defined in claim 28, said glycol being propylene glycol and the fatty acids being stearic and palmitic acids, said partial ester having a mono-ester content between 40% and 80% and amounting to 10–15% by weight of the composition.

30. A powdered fat composition as defined in claim 29, said mixture of sodium caseinate and sucrose being about 40% by weight of the composition.

31. A topping powder comprising a dried emulsion of a fat and the partial ester of an edible glycol and a higher saturated fatty acid in a matrix of hydrophilic proteinaceous encapsulating solids, said dried emulsion having been cooled to crystallize the fat phase thereof.

32. A topping powder comprising a dried emulsion of a fat, lecithin, and the partial ester of an edible glycol and a higher saturated fatty acid in a matrix of hydrophilic proteinaceous encapsulating solids, said dried emulsion having been cooled to crystallize the fat phase thereof.

33. A topping powder comprising a dried emulsion of a fat, lecithin, and the partial ester of an edible glycol and a higher saturated fatty acid in a matrix of hydrophilic proteinaceous encapsulating solids and a sugar, said dried emulsion having been cooled to crystallize the fat phase thereof.

34. A topping powder comprising a dried emulsion of a fat and the partial ester of propylene glycol and a higher saturated fatty acid in a matrix of hydrophilic proteinaceous encapsulating solids, said solids including a water soluble proteinaceous material, said dried emulsion having been cooled to crystallize the fat phase thereof.

35. A topping powder comprising a dried emulsion of a fat and the partial ester of propylene glycol and a higher saturated fatty acid in a matrix of hydrophilic proteinaceous encapsulating solids, said solids including a water soluble proteinaceous material and a sugar, said dried emulsion having been cooled to crystallize the fat phase thereof.

References Cited in the file of this patent

UNITED STATES PATENTS

| Number | Name | Date |
| --- | --- | --- |
| 1,928,781 | Chapin | Oct. 3, 1933 |
| 2,035,899 | Kraft | Mar. 31, 1936 |
| 2,065,676 | Fechner | Dec. 29, 1936 |
| 2,132,687 | Harris | Oct. 11, 1938 |
| 2,223,558 | Epstein | Dec. 3, 1940 |
| 2,431,497 | North et al. | Nov. 25, 1947 |
| 2,431,498 | North et al. | Nov. 25, 1947 |
| 2,445,948 | Wittcoff | July 27, 1948 |
| 2,508,393 | Jaeger | May 23, 1950 |
| 2,619,423 | Diamond | Nov. 25, 1952 |

UNITED STATES PATENT OFFICE
Certificate

Patent No. 2,913,342             Patented November 17, 1959

Donald E. Cameron, William H. Chilson, Charles C. Elsesser and
Rudolf Windmuller Application having been made jointly by Donald E. Cameron, William H. Chilson, Charles C. Elsesser, and Rudolf Windmuller, the inventors named in the patent above identified; and General Foods Corporation, White Plains, New York, a corporation of Delaware, the assignee, for the issuance of a certificate under the provisions of Title 35, Section 256 of the United States Code, deleting the name of the said Charles C. Elsesser from the patent as a joint inventor, and a showing and proof of facts satisfying the requirements of the said section having been submitted, it is this 2nd day of February 1965, certified that the name of the said Charles C. Elsesser is hereby deleted from the said patent as a joint inventor with the said inventors named in the patent.

[SEAL]

EDWIN L. REYNOLDS,
*First Assistant Commissioner of Patents.*